(12) United States Patent
Hoffjann et al.

(10) Patent No.: US 9,130,204 B2
(45) Date of Patent: Sep. 8, 2015

(54) SYSTEM FOR DRYING THE EXHAUST GASES FROM A FUEL CELL SYSTEM USING THE EXISTING LIQUID HYDROGEN AS A HEAT SINK

(75) Inventors: Claus Hoffjann, Hamburg (DE); Johannes Lauckner, Hamburg (DE)

(73) Assignee: Airbus Operations GmbH (DE)

( * ) Notice: Subject to any disclaimer, the term of this patent is extended or adjusted under 35 U.S.C. 154(b) by 98 days.

(21) Appl. No.: 13/408,220

(22) Filed: Feb. 29, 2012

(65) Prior Publication Data

US 2012/0210747 A1      Aug. 23, 2012

Related U.S. Application Data

(63) Continuation of application No. PCT/EP2010/062604, filed on Aug. 30, 2010.

(60) Provisional application No. 61/239,481, filed on Sep. 3, 2009.

(30) Foreign Application Priority Data

Sep. 3, 2009   (DE) .......................... 10 2009 040 013

(51) Int. Cl.
*F25D 21/00*   (2006.01)
*H01M 8/04*    (2006.01)
*B64D 41/00*   (2006.01)

(52) U.S. Cl.
CPC ...... *H01M 8/04156* (2013.01); *H01M 8/04373* (2013.01); *H01M 8/04776* (2013.01);
(Continued)

(58) Field of Classification Search
CPC ................... B64D 2041/005; H01M 2250/20; H01M 8/04156; H01M 8/04164; H01M 8/04373; H01M 8/04776; Y02E 60/50

USPC ........ 62/80, 532, 93, 333; 429/434, 435, 436, 429/444
See application file for complete search history.

(56) References Cited

U.S. PATENT DOCUMENTS 6,007,931 A    12/1999 Fuller et al.
7,185,447 B2 *  3/2007 Arbeiter .......................... 34/471
(Continued)

FOREIGN PATENT DOCUMENTS

CN     1323450 A      11/2001
DE   102005054885 A1    5/2007
(Continued)

OTHER PUBLICATIONS

Chinese Office Action for Application No. 201080049921.7 dated Mar. 24, 2014.

*Primary Examiner* — Cheryl J Tyler
*Assistant Examiner* — Ana Vazquez
(74) *Attorney, Agent, or Firm* — Lerner, David, Littenberg, Krumholz & Mentlik, LLP

(57) ABSTRACT

A system for the drying of exhaust gases from a fuel cell system includes two heat exchangers alternately exposed to an exhaust gas, which ice and accumulate water vapour from the exhaust gas by cooling through a coolant. A valve arrangement with a number of valves is adapted in such a manner that it operates one of the heat exchangers in an icing phase, in which the icing of water vapour is conducted, and the other heat exchanger in a regeneration phase, in which the accumulated ice melts and is extracted, in an alternating manner. This system is especially suitable in aircraft for drying an oxygen depleted exhaust gas from a fuel cell system for inerting a tank.

14 Claims, 4 Drawing Sheets

(52) U.S. Cl.
CPC ...... *B64D2041/005* (2013.01); *H01M 8/04164* (2013.01); *H01M 2250/20* (2013.01); *Y02E 60/50* (2013.01); *Y02T 90/32* (2013.01); *Y02T 90/36* (2013.01)

(56) References Cited

U.S. PATENT DOCUMENTS

| | | | |
|---|---|---|---|
| 7,759,011 | B2 | 7/2010 | Hoffjann et al. |
| 2002/0112479 | A1 | 8/2002 | Keefer et al. |
| 2002/0158167 | A1* | 10/2002 | Schmutz et al. ............ 244/129.2 |
| 2003/0205371 | A1* | 11/2003 | Lines et al. .................... 165/299 |
| 2004/0028966 | A1 | 2/2004 | Hibbs et al. |
| 2004/0069014 | A1* | 4/2004 | Chou ................................ 62/541 |
| 2007/0068713 | A1* | 3/2007 | Komura et al. ............... 180/65.3 |
| 2007/0111060 | A1 | 5/2007 | Hoffjann et al. |
| 2007/0172707 | A1 | 7/2007 | Hoffjann et al. |
| 2012/0055183 | A1* | 3/2012 | Bohlen et al. ...................... 62/91 |

FOREIGN PATENT DOCUMENTS

| | | |
|---|---|---|
| DE | 102007046381 A1 | 4/2009 |
| EP | 1619738 A2 | 1/2006 |
| EP | 1902954 A2 | 3/2008 |

* cited by examiner

SYSTEM FOR DRYING THE EXHAUST GASES FROM A FUEL CELL SYSTEM USING THE EXISTING LIQUID HYDROGEN AS A HEAT SINK

REFERENCE TO RELATED APPLICATIONS

The present application is a continuation of International Application No. PCT/EP2010/062604, filed Aug. 30, 2010, which claims the benefit of U.S. Provisional Patent Application No. 61/239,481, filed Sep. 3, 2009 and of German Patent Application No. 10 2009 040 013.3, filed Sep. 3, 2009, the entire disclosures of which are hereby incorporated herein by reference.

TECHNICAL FIELD

The present invention relates to a system for the drying of exhaust gases from a fuel cell system, a process for the drying of exhaust gases from a fuel cell system, an application and also an aircraft having at least one fuel cell system and a system for the drying of exhaust gases from the fuel cell system.

BACKGROUND TO THE INVENTION

Fuel cell systems have already been devised or already introduced into commercial aircraft for accomplishing various tasks. Besides the generation of electricity, other tasks can be accomplished, such as inerting a fuel tank by means of the exhaust gases from a fuel cell system. In general, if moist air is used in order to inert a fuel tank the problem arises in that fuel, and kerosene in particular, is hygroscopic and in addition a population of bacteria can arise that can affect the sensors that determine the level of fuel in the tanks and cause them to malfunction and even to form ice crystals, which can damage the engine injector nozzles and the fuel filters when the aircraft is in flight or on the ground at temperatures below freezing point.

DE 10 2005 054 885 A1 and US 2007/0111060 A1 disclose a safety system for reducing the risk of explosions in a fuel tank, in which a protective gas generation device incorporates a fuel cell system with a fuel cell and produces a protective gas generated by the fuel cell during the operation of the fuel cell system.

According to the current state of the art, different systems and processes are known for the drying of air. In this way, for example, it would be possible to create adsorption through the use of hygroscopic media, for example silica gel. However, the ability of a hygroscopic medium to absorb water is not limitless, and it therefore needs to be either replaced or regenerated. In an aircraft in particular, any such replacement will result in pronounced weight problems, while the constant emptying and refilling adds significantly to the maintenance costs. At the same time, regeneration could be possible through an appropriate introduction of heat, for example by heated air. However, this would compromise the effectiveness of the fuel cell system, as a considerable energy expenditure would be required for thermal regeneration. If regeneration shall not be carried out, gas drying is only possible for a limited time. In general, in such processes, dew points—that is to say temperatures at which condensing and evaporating water are in a state of equilibrium—arise, which are in the region of double negative figures.

A further process for drying air involves water transfer by means of a selective membrane and the use of a partial pressure difference. Here, a membrane is used, which separates gas that has yet to be dried from gas that has already been dried, whereby the passage of water through the membrane takes place as a result of the partial pressure difference. As an alternative to the very dry gas, the static pressure can be increased on the side of the membrane on which the gas to be dried is located. This process is restricted by the partial pressure difference that is attainable in its drying capacity. Especially low dew points for a membrane pressure air dryer can only be achieved if a very high operating pressure is used in conjunction with the necessarily high compressor capacity.

A further third process is known from the state of the art for drying gases, which involves cooling the gas to below the dew point, which requires only a heat exchanger and a heat sink, or a cooling medium. In addition to the cooling, and for the final separation of liquid water and gaseous residual gas, a drip tray is usually required. However, this principle requires a really high cooling capacity, as liquid product water is present and the energy that is released at the phase transition has to be removed. The cold required to cool the gas can partly be retained in an attached recuperative heat exchanger. In principle, the attainable dew point is limited by the freezing point, as because of the icing arising within the heat exchanger through the current construction method, the gas channels may become blocked.

SUMMARY OF THE INVENTION

Accordingly, the object of the present invention can be seen as proposing a system for cooling the exhaust gases from a fuel cell system that either reduces or completely eliminates the disadvantages indicated above.

In particular, the object of the present invention can be seen to propose a system for drying the exhaust gas from a fuel cell system that enables maximum drying of the exhaust gas to be achieved at a minimal energy input without causing any significant increase in the complexity of the fuel cell system yet at the same time minimizing the additional weight.

The above object is met by a system for drying the exhaust gas from a fuel cell system in accordance with the independent Claim 1. Advantageous further embodiments can be found in the subsequent claims.

According to one aspect of the present invention, the system according to the invention for drying the exhaust gases from a fuel cell system comprises at least a first heat exchanger, at least a second heat exchanger, a common gas exhaust inlet and a common exhaust gas outlet, a common coolant inlet and a common coolant outlet, a common air outlet, a valve arrangement comprising a number of valves and at least one condensate outlet to extract the condensate. The valve arrangement is adapted for either operating the first heat exchanger or the second heat exchanger is operated in an icing phase and for operating the other heat exchanger in a regeneration phase. During the icing phase, at least a part of an exhaust gas flow that enters the common exhaust gas inlet and that exits the common exhaust gas outlet and a flow of coolant that enters the common coolant inlet and exits the common coolant outlet flows through the respective heat exchanger for icing the water vapour present in the exhaust gas. In the regeneration phase of the heat exchanger in question, at least a part of the exhaust gas flows from the common exhaust gas inlet, thaws the ice condensate that has formed and extracts it through the condensate extractor.

A fuel cell system is usually operated by the supply of a fuel and a sufficient quantity of oxygen-rich air. It can be imagined that the fuel for a fuel cell—especially while in the air, but possibly also on the ground—could be at a really low temperature, which might have the effect of icing the water vapour in the exhaust gas in a heat exchanger. Without laying any claim to completeness, it can be stated that this fuel could be a conventional fuel, which is used to power the engines of an aircraft and which, before reaching a reformer, could flow accordingly through the first or the second heat exchanger. At the same time, it is also possible for pure hydrogen to be used that has to be stored in a cryogenic state on board an aircraft and accordingly its temperature is very low.

When using conventional heat exchangers to cool down exhaust gases, and especially if the temperature level of the coolant is low, icing can occur inside the heat exchanger, which will tend to block the conduits inside the heat exchanger. As a result, with effect from a certain degree of icing, the heat exchanger will no longer function properly. However, by integrating two separate heat exchangers, the icing of the water vapour can still be turned to advantage by operating the two heat exchangers alternately, i.e. in turn. This will require the mass flow of the fuel cell exhaust gas to be divided. If, for example, the first heat exchanger is exposed to the coolant, so that the through-flowing exhaust gas is dried by the water vapour, the first heat exchanger is slowly filled with ice. In order to prevent the operation of the heat exchanger from being affected by the icing, the flow of the coolant can be interrupted and the flow of the exhaust gas to this first heat exchanger can be reduced in order to subsequently expose the second heat exchanger to the coolant and a greater quantity of the exhaust gas. After this switching process, the first heat exchanger is no longer in the icing phase, but in a regeneration phase. In the regeneration phase, the heat exchanger can be gradually heated by the warm mass flow of part of the flow of the fuel cell exhaust gas, so that the accumulated ice slowly thaws and can be extracted from the heat exchanger by a condensate extractor. During this regeneration phase, the water vapour from the exhaust gas accumulates exclusively as ice in the second heat exchanger, which, once a given filling level has been attained, should revert to a regeneration phase.

On the basis of this forced icing of the water vapour from the exhaust gas and the alternating icing and regeneration phase, the disadvantages of the conventional heat exchanger can be eliminated, whereby at the same time a very low dew point can be achieved because of the rapid cooling of the exhaust gas.

In an advantageous embodiment of the system according to the invention, the common coolant inlet is connected to a tank for liquid hydrogen. This allows a particularly low temperature to be achieved within the respective heat exchanger, so that in particular the dew point of the exhaust gas lies well in the double minus figure in terms of degrees Celsius.

It is also preferred for the common exhaust gas outlet to be connected to a fuel tank for the introduction of dry, oxygen-depleted air for inerting. In this way, a waste product in the form of a dry oxygen-depleted air that arises within the fuel cell can be re-used and at the same time it can counteract the tendency for bacteria to be formed in the tank, or the icing process or any measurement errors at the tank level filling sensors.

In a further preferred embodiment of the system according to the invention, the common coolant outlet is connected to a tank for liquid hydrogen. This has the effect of introducing heat into at least one area of the tank for liquid hydrogen, which is necessary for the extraction of hydrogen in gaseous form from a cryogenic tank with hydrogen.

Furthermore, it is particularly advantageous for the system according to the invention to comprise a processing unit that is connected to the valve arrangement, which processing unit is adapted to control the valve arrangement in such a way that the first heat exchanger and the second heat exchanger are operated alternately in an icing phase and in a regeneration phase. This will prevent excessive icing in both of the heat exchangers, as no further manual intervention is necessary.

It is especially preferred if, by means of known characteristic icing curves, the processing unit of the first heat exchanger and the second heat exchanger can, on the basis of the surrounding conditions, independently determine an appropriate point in time for the switchover of the valve arrangement and also carries out the switching of the valve arrangement. The surrounding conditions could include, for example, the ambient temperature of the heat exchangers, the temperature of the coolant, the temperature of the introduced exhaust gas and the air pressure. In this way, on the basis of the known characteristics of the heat exchangers, it is possible to determine when a maximum ice saturation can be anticipated before the heat exchanger becomes completely blocked with ice. This increases the safety and the reliability of the system according to the invention.

Moreover, the first and the second heat exchanger can comprise sensors to detect their respective degrees of icing and/or temperature sensors to determine their temperature levels. These sensors could be connected with the processing unit to establish the most favourable point in time for the switching process, so that a further increase in reliability and safety of the system according to the invention is obtained.

It is particularly advantageous if the system according to the invention comprises a third heat exchanger, with a third coolant inlet, a third coolant outlet, a third exhaust gas inlet and a third exhaust gas outlet, wherein the third coolant inlet is connected with the common coolant outlet of the first heat exchanger and the second heat exchanger. In this way, a type of "pre-condensation" can be achieved, which can remove a large part of the existing water vapour from the exhaust gas and improve the efficiency of the subsequent first and second heat exchangers.

It is especially advantageous if the third coolant outlet of the third heat exchanger is arranged in such a manner that it is connected to a fuel inlet of a fuel cell system. By flowing through two heat exchangers, which are exposed to an exhaust gas from a fuel cell system, the coolant is simultaneously heated and can, in particular, be prepared for use in a fuel cell system. If the fuel cell system is expected to operate with hydrogen, care must be taken to ensure that the inflow of hydrogen gas has a temperature that is, if possible, above the freezing point of water, so as to prevent any icing effects.

Finally, a system according to the invention can comprise a fourth heat exchanger with a fourth coolant inlet, a fourth coolant outlet, a fourth exhaust gas inlet and a fourth exhaust gas outlet, wherein the fourth coolant inlet is connected with the common exhaust gas outlet of the first heat exchanger and the second heat exchanger and wherein the fourth exhaust gas outlet is connected to the third exhaust gas inlet of the third heat exchanger. As in the aforementioned two or three heat exchangers, the exhaust gas has already been significantly cooled, a relatively cool exhaust gas can be taken from the common exhaust gas outlet of the first heat exchanger and the second heat exchanger, which can transfer its cold through the fourth heat exchanger described above back to the system according to the invention and thereby increase the efficiency of the system according to the invention.

The additional "third" and "fourth" notion of the coolant inlets and outlets and of the exhaust gas inlets and outlets is meant purely to signify the relevance of the respective heat exchanger.

Furthermore, the object is achieved by a method for drying of exhaust gases from a fuel cell system, which essentially comprises the steps of introducing exhaust gas from a fuel cell system into a first heat exchanger and exposing the first heat exchanger with a coolant for icing the water vapour contained in the exhaust gas, interrupting this introduction and reducing the introduction of exhaust gas in order to regenerate the first heat exchanger, introducing coolant and exposing the exhaust gas from the second heat exchanger for its regeneration.

Finally, it is especially advantageous if the method according to the invention performs these steps continuously and in sequence.

Finally, the object is also achieved by a use of the system according to the invention in an aircraft and also by an aircraft with at least one fuel cell system and a device for cooling the exhaust gases from the fuel cell system.

BRIEF DESCRIPTION OF THE DRAWINGS

Further features, advantages and possible application options of the present invention will become apparent from the following description of the embodiments and the drawings. In this respect, all the described and/or schematically represented features are, both in themselves and in any possible combination, constitute the object of the present invention, regardless of their actual composition in the individual claims or in their retroactive applications. In the figures, the same references are used for identical as for similar objects.

DETAILED DESCRIPTION OF EXEMPLARY EMBODIMENTS

Figure 1:
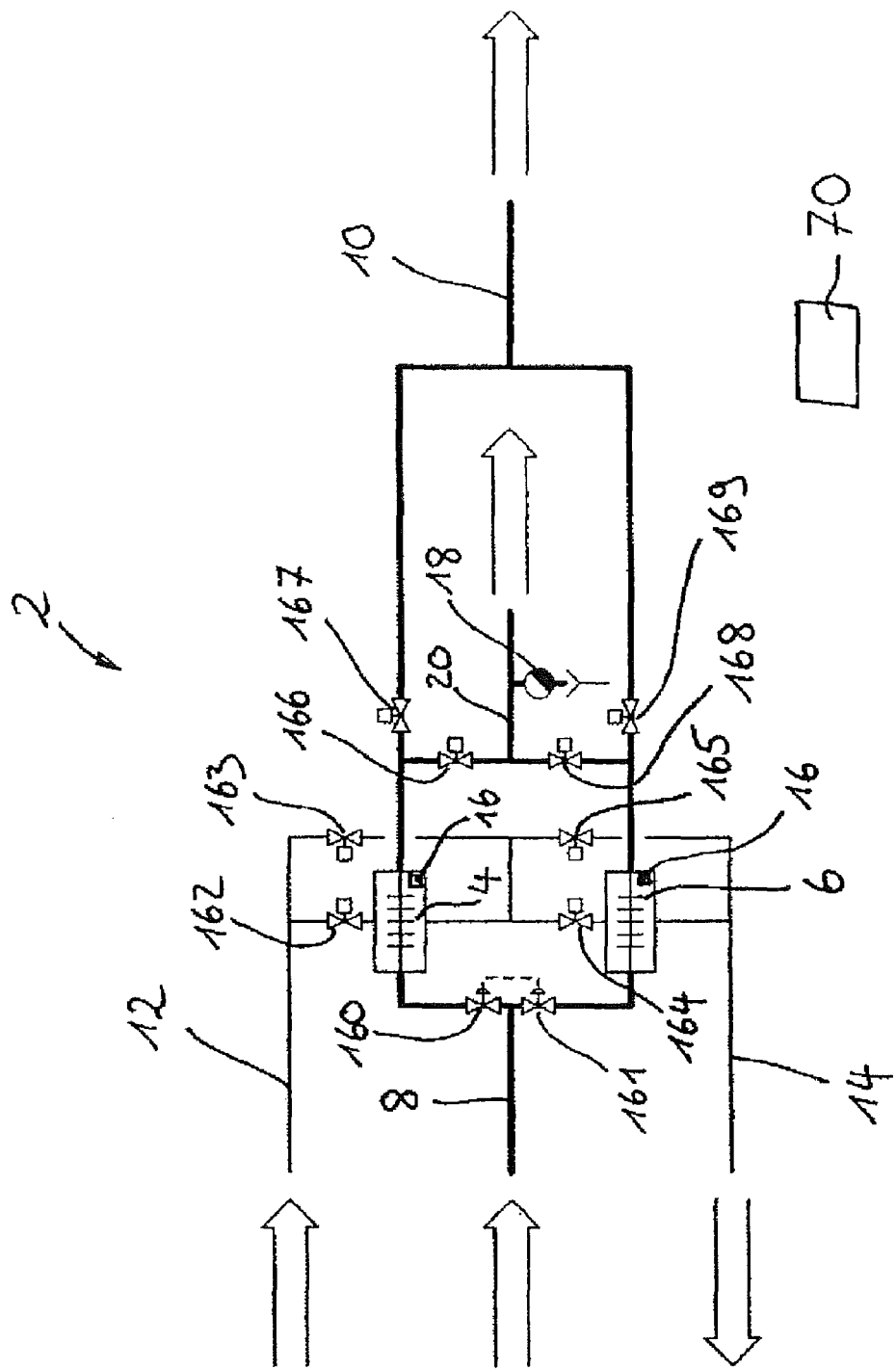
FIG. 1 shows a system according to the invention with a first heat exchanger and a second heat exchanger.

FIG. 1 shows a system 2 according to the invention for drying the exhaust gases from a fuel cell system that comprises at least one first heat exchanger 4, at least one second heat exchanger 6, a common exhaust gas inlet 8, a common exhaust gas outlet 10, a common coolant inlet 12 and a common coolant outlet 14. Moreover, exemplarily a number of valves 160-169 is arranged in the system according to the invention, which together form the arrangement described as "the valve arrangement". Moreover, a condensate extractor 18 is arranged in the system according to the invention in a position at an air outlet 20.

Figure 2:
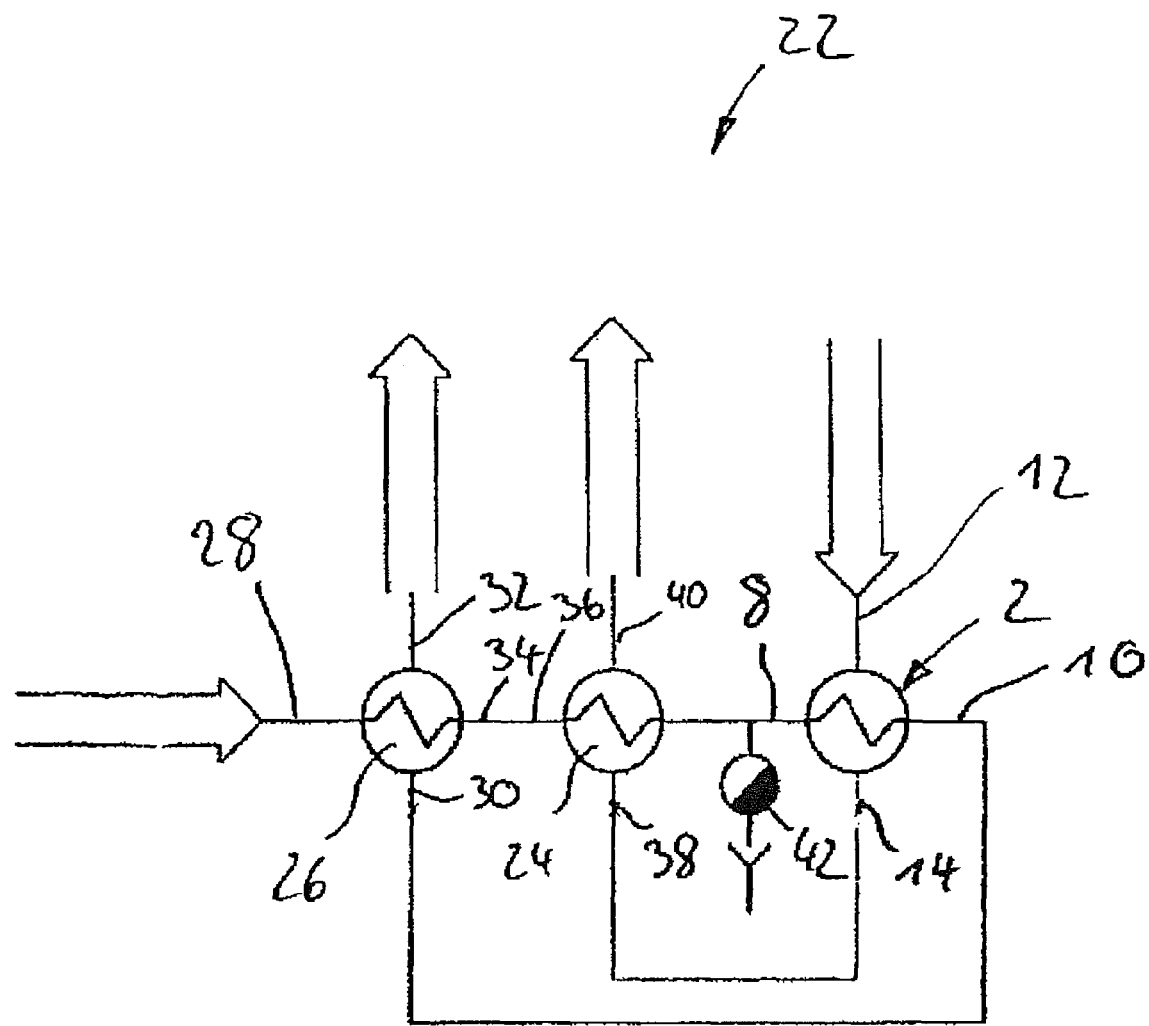
FIG. 2 shows a system according to the invention with an additional third heat exchanger and an additional fourth heat exchanger.

The first heat exchanger 4 and the second heat exchanger 6 respectively comprise a coolant inlet, a coolant outlet an exhaust gas inlet and an exhaust gas outlet. For the sake of clarity, no explicit references are given for these. The subsequent FIG. 2 shows the explicitly indicated analogy in relation to further heat exchangers, of which the respective inlets and outlets are indicated by the additional words "third" and "fourth". The respective inlets and outlets of the first and second heat exchanger 4 and 6 would, in this case, be indicated by the references "first" and "second", respectively.

The exhaust gas inlet 8 is connected to an exhaust gas connection of a fuel cell system, which is not shown here. In the case that is demonstrated, for example, the coolant inlet 12 and the coolant outlet 14 are connected to a tank for liquid hydrogen.

By exposing the exhaust gas inlet 8 to an exhaust gas containing water vapour, it is intended that the valves 160 and 161, which are constructed as proportional valves, divide the flow of the exhaust gas into two partial flows, flowing to the first heat exchanger 4 and to the second heat exchanger 6. For cooling the first heat exchanger 4 or the second heat exchanger 6, the valves 162 to 165 are opened and closed, respectively, that the respective heat exchanger 4 or the heat exchanger 6 is exposed to hydrogen from the common coolant inlet 12, which, as a result of passing through the respective heat exchanger 4 or 6, has a temperature close to the boiling point of hydrogen and results in the freezing of almost the entire water vapour in the flow of exhaust gas. This is referred to below as "the icing phase". Once a required or an acceptable filling level with accumulated ice has been achieved in the respective heat exchanger 4 or 6, the valves 162 to 165 are switched over in a manner that the cooling of the heat exchanger 4 or 6 is ended and that of the respective other heat exchanger 6 or 4 is started. In general, the hydrogen flowing through the respective heat exchanger 4 or 6 flows into the common coolant outlet 14, while the connection between the common cooling outlet 14 and the respective other heat exchanger 6 or 4 is closed.

During the icing phase of a heat exchanger 4 or 6, the valves 166 to 169 are opened and closed, respectively, in a manner that the exhaust gas flowing from the respective heat exchanger 4 or 6 reaches the common exhaust gas outlet and is available for inerting the fuel tank. The connection of the common exhaust gas outlet 10 with the respective other heat exchanger 6 or 4 is interrupted.

In a subsequent regeneration phase, the respective heat exchanger 4 or 6 is no longer cooled by the coolant, but only flown through by exhaust gas from the common exhaust gas inlet 8, while the exhaust gas subsequently passes into the common exhaust gas outlet 20, from which it is extracted into the environment. The introduction of heat leads to a thawing of the accumulated ice. At the same time, the melting water from the accumulated ice is extracted from the common exhaust gas outlet 20 through a condensate extractor 18. The connection of the respective heat exchanger 4 or 6 with the common exhaust gas outlet 10 is interrupted by the closure of the valve 167 and 169, respectively.

The result of the alternate operation of the two heat exchangers 4 and 6 respectively during an icing and a regeneration phase is that neither of the two heat exchangers 4 or 6 is completely filled with accumulated ice and therefore blocked.

By way of example, the following table shows the regeneration phase of the first heat exchanger 4 and the icing phase of the second heat exchanger 6 as a result of the respective operation of the valves 160-169.

| | |
|---|---|
| Valve 160 more open | Valve 161 more closed |
| Valve 162 closed | Valve 164 open |
| Valve 163 open | Valve 165 closed |
| Valve 167 closed | Valve 169 open |
| Valve 166 open | Valve 168 closed |

It should be noted that the expression "more closed" or "more open" indicates that the valves 160 and 161, exemplarily constructed as proportional valves, are not completely closed and open, respectively, in order to achieve a division of the exhaust gas flow, so that in each phase sufficient exhaust gas is available for drying by icing and for regeneration, respectively.

The following table shows the reverse case, in which the first heat exchanger is operated in the icing phase and the second heat exchanger is operated in the regeneration phase.

| | |
|---|---|
| Valve 160 more closed | Valve 161 more open |
| Valve 162 open | Valve 164 closed |
| Valve 163 closed | Valve 165 open |
| Valve 167 open | Valve 169 closed |
| Valve 166 closed | Valve 168 open |

An exemplary processing unit 70 as shown, with connections to the individual valves 160 to 169 not shown explicitly for the sake of clarity, is adapted for controlling valves 160 to 169 in such a way that an automatic switchover between icing phases and regeneration phases takes place. For this to be achieved, it is recommended that sensors 16 be incorporated into the heat exchangers 4 and 6 so that the respective degree of icing can be detected thereby enabling the processing unit 70 to determine a suitable switchover moment.

Exhaust gas with a very low or a diminishing amount of water content then flow out of the exhaust gas outlet 10, so that this dried exhaust gas is especially suitable for inerting of a tank system or a similar installation.

FIG. 2 shows a further development in the form of a system 22 according to the invention for drying of exhaust gases from a fuel cell system. Here, the system 2 according to the invention has been extended in accordance with FIG. 1 and comprises a third heat exchanger 24 and a fourth heat exchanger 26. Exhaust gas flows from an exhaust gas inlet 28 into the fourth heat exchanger 26, from there into the third heat exchanger 24 and from there into the common exhaust gas inlet 8 of the system 2 according to the invention, which is shown here as a function block. The fourth heat exchanger 26 comprises a fourth coolant inlet 30, which is connected to the common exhaust gas outlet 10 of the system 2 according to the invention. As a result of the constant cooling of the exhaust gas, the exhaust gas flowing out of the common exhaust gas outlet 10 is significantly colder than the exhaust gas located at the common exhaust gas inlet 28 directly from the fuel cell system. The fourth heat exchanger 26 thus enables the effectiveness of the system 22 according to the invention to be increased, as at least a part of the cooling capacity can remain in the system 22. The exhaust gas flowing through the fourth heat exchanger 26 flows out of the coolant outlet 32 of the fourth heat exchanger 26 and can be used for example as a means of rendering the tank system inert.

The exhaust gas flowing out of the fourth heat exchanger 26 flows into the third exhaust gas inlet 36 of the third heat exchanger 24. There it is cooled by a coolant that flows in through a third coolant inlet 38 into the third heat exchanger 24 and then flows out again through a third coolant outlet 40. The third coolant inlet 38 of the third heat exchanger 24 is connected to the common coolant outlet 14 of the system 2 according to the invention. As the very cold gaseous hydrogen located at the common coolant inlet 12 has already absorbed heat in three heat exchangers 4, 6 and 24, it can be used for the operation—for example—of a fuel cell system (not shown). In this respect, care must be taken to ensure that the temperature of the gaseous hydrogen lies if possible above zero degrees Celsius. It is possible that a downstream heating device might be necessary at the third coolant outlet 40 of the third heat exchanger 24.

Any condensate arising is extracted from the system 22 according to the invention via a condensate extractor 42. Using the third heat exchanger 24 and the fourth heat exchanger 26 enables the greater part of the water vapour to be condensed out of the exhaust gas, wherein in the system 22 according to the invention a residual drying is effected and a very low dew point is achieved.

Figure 3:
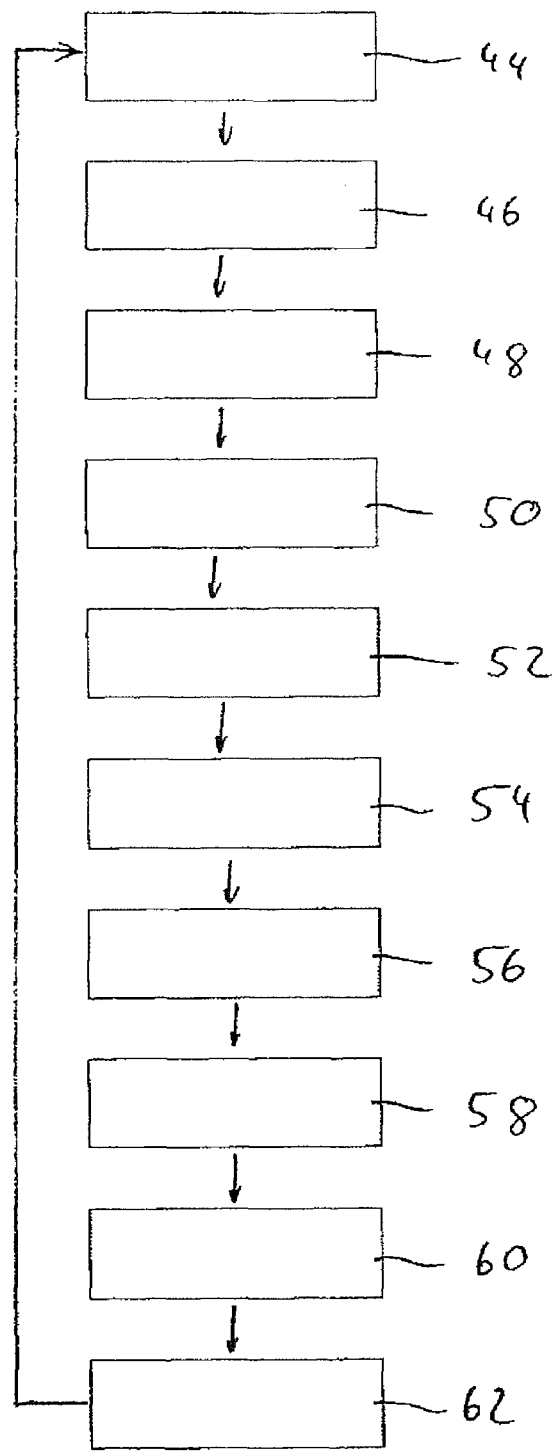
FIG. 3 shows the system according to the invention in schematic form.

By means of a block diagram, FIG. 3 schematically shows a method according to the invention that comprises essentially the steps for the introduction 44 of exhaust gases from a fuel cell system into a first heat exchanger, the exposure 46 of the first heat exchanger to a coolant for the purpose of icing the water vapour contained in the exhaust gas, the reduction 48 of the introduction of exhaust gas into the first heat exchanger and the interruption of the exposure 50 process to the coolant in order to thaw accumulated condensate ice and the extraction 52 of this by means of at least one condensate extractor, the introduction 54 of exhaust gas from a fuel cell system into a second heat exchanger and the exposure 56 of the first heat exchanger to a coolant in order to ice the water vapour contained in the exhaust gas as well as the reduction 58 of the introduction of the exhaust gas into the second heat exchanger and the interruption of the exposure 60 to the coolant in order to thaw the accumulated condensate ice and the extraction 62 of this by means of the condensate extractor.

Figure 4:
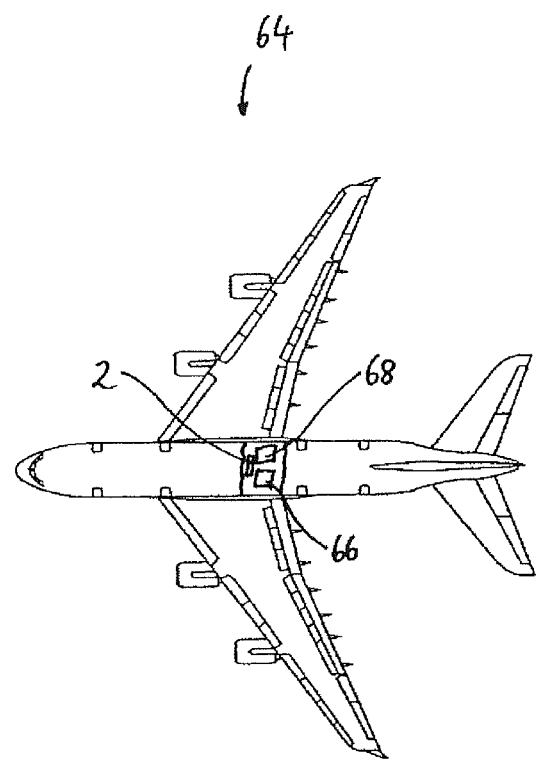
FIG. 4 shows an aircraft having at least one fuel cell system and a device for drying the exhaust gases from this fuel cell system.

Finally, FIG. 4 shows an aircraft 64 with a fuel cell system 66, a cryogenic hydrogen tank 68 and a device 2 according to the invention, in which the exhaust gas from the fuel cell 66 is dried by means of the device 2 according to the invention.

Additionally, it must be pointed out that the term "comprising" is not intended to exclude any other elements or steps and the word "a" or "an" is not intended to exclude a plurality. It must also be pointed out that any features or steps that are described with a reference to any of the embodiments cited above can also be used in combination with other features or steps pertaining to other embodiments described above. References contained in the claims are not intended to be limitative.

REFERENCES

2 System according to the invention
4 First heat exchanger
6 Second heat exchanger
8 Common exhaust gas inlet
10 Common exhaust gas outlet
12 Common coolant inlet
14 Common coolant outlet
16 Sensor
160-169 Valves
18 Condensate extractor
20 Condensate extractor
22 System according to the invention
24 Third heat exchanger
26 Fourth heat exchanger
28 Exhaust gas inlet
30 Coolant inlet
32 Coolant outlet
34 Exhaust gas outlet
36 Exhaust gas inlet
38 Coolant inlet
40 Coolant outlet
42 Condensate extractor
44 Introduction of exhaust gases
46 Exposure to coolant
48 Interruption of exhaust gas introduction
50 Interruption of exposure to coolant
52 Extraction of condensate
54 Introduction of exhaust gas
56 Exposure to coolant
58 Interruption of exhaust gas introduction 60 Interruption of exposure to coolant
62 Extraction of condensate
64 Aircraft
66 Fuel cell system
68 Cryogenic hydrogen tank
70 Processing unit.

The invention claimed is:

1. A system for drying of exhaust gases from a fuel cell system, comprising:
- at least one first heat exchanger;
- at least one second heat exchanger;
- a common exhaust gas inlet and a common exhaust gas outlet for the first and second heat exchangers;
- a common coolant inlet and a common coolant outlet for the first and second heat exchangers;
- a common air outlet for the first and second heat exchangers;
- a valve arrangement with a plurality of valves; and
- at least one condensate extractor for extracting condensate;
- wherein the valve arrangement is adapted for operating either the first heat exchanger or the second heat exchanger in an icing phase and for operating the respective other heat exchanger in a regeneration phase;
- wherein in the icing phase a first part of a flow of exhaust gas into the common exhaust gas inlet and out of the common exhaust gas outlet and a flow of coolant into the common coolant inlet and out of the common coolant outlet flow through the respective heat exchanger in order to ice water vapour contained in the exhaust gas; and
- wherein in the regeneration phase a second part of the exhaust gas flows out of the common exhaust gas inlet through the respective heat exchanger to the common air outlet and thereby thaws the ice formed in the respective heat exchanger, subsequently extracting the thawed ice through the condensate extractor.

2. The system according to claim 1, wherein the common coolant inlet is connected to a cryogenic hydrogen tank.

3. The system according to claim 1, wherein the common coolant outlet is connected to a cryogenic hydrogen tank.

4. The system according to claim 1, wherein the common exhaust gas outlet is connected to a fuel tank for inerting the free volume of the tank.

5. The system according to claim 1, further comprising a processing unit connected to the plurality of valves, and adapted in such a manner that the valves are so controlled that the first heat exchanger and the second heat exchanger are operated alternately in an icing phase and a regeneration phase.

6. The system according to claim 5, wherein the processing unit, on the basis of first and second characteristic icing curves of the first heat exchanger and the second heat exchanger, respectively, automatically determines a favourable time for the activation of the plurality of valves in relation to surrounding conditions.

7. The system according to claim 6, wherein the first heat exchanger and the second heat exchanger comprise a first and second sensor to determine the respective degrees of icing and/or temperatures of the first and second heat exchangers, said first and second sensors being connected to the processing unit to determine a favourable time for the activation of the plurality of valves.

8. The system according to claim 1, further comprising a third heat exchanger with a third coolant inlet, a third coolant outlet, a third exhaust gas inlet and a third exhaust gas outlet, wherein the third coolant inlet is connected to the common coolant outlet of the first heat exchanger and the second heat exchanger and wherein the third exhaust gas outlet is connected to the common exhaust gas inlet of the first heat exchanger and the second heat exchanger.

9. The system according to claim 8, wherein the third coolant outlet is configured so as to be connectable to a fuel inlet of a fuel cell system.

10. The system according to claim 8, comprising a fourth heat exchanger with a fourth coolant inlet, a fourth coolant outlet, a fourth exhaust gas inlet and a fourth exhaust gas outlet, wherein the fourth coolant inlet is connected to the common coolant outlet of the first heat exchanger and the second heat exchanger and wherein the fourth exhaust gas outlet is connected to the third exhaust gas inlet.

11. A method for drying of exhaust gases from a fuel cell system, comprising:
- introducing a first part of exhaust gas from the fuel cell system into a first heat exchanger and exposing the first heat exchanger to a coolant for icing water vapour contained in the exhaust gas;
- reducing the first part of the exhaust gas introduced into the first heat exchanger and interrupting the exposure to the coolant for thawing the accumulated condensate ice and extracting the condensate by at least one condensate extractor;
- introducing a second part of the exhaust gas from the fuel cell system into a second heat exchanger and exposing the first heat exchanger to a coolant for icing water vapour contained in the exhaust gas; and
- reducing the second part of the exhaust gas introduced into the second heat exchanger and interrupting the exposure to the coolant for thawing the ice and extracting of the thawed ice by the condensate extractor.

12. The method according to claim 11, wherein the steps are carried out continuously in sequence, wherein, if the process is carried out continuously, the introduction of the exhaust gas is achieved by increasing the exhaust gas flow.

13. The method according to claim 11, wherein hydrogen with a temperature in a range of the hydrogen boiling point is used as a coolant from a cryogenic hydrogen tank.

14. An aircraft comprising at least one fuel cell system, at least one cryogenic hydrogen tank and at least one system for the drying of exhaust fuels from the fuel cell system, comprising:
- at least one first heat exchanger;
- at least one second heat exchanger;
- a common exhaust gas inlet and a common exhaust gas outlet for the first and second heat exchangers;
- a common coolant inlet and a common coolant outlet for the first and second heat exchangers;
- a common air outlet for the first and second heat exchangers;
- a valve arrangement with a plurality of valves; and
- at least one condensate extractor for extracting condensate;
- wherein the valve arrangement is adapted for operating either the first heat exchanger or the second heat exchanger in an icing phase and for operating the respective other heat exchanger in a regeneration phase;
- wherein in the icing phase a first part of a flow of exhaust gas into the common exhaust gas inlet and out of the common exhaust gas outlet and a flow of coolant into the common coolant inlet and out of the common coolant outlet flow through the respective heat exchanger in order to ice water vapour contained in the exhaust gas; and
- wherein in the regeneration phase a second part of the exhaust gas flows out of the common exhaust gas inlet through the respective heat exchanger to the common air outlet and thereby thaws the ice formed in the respective heat exchanger, subsequently extracting the thawed ice through the condensate extractor.

\* \* \* \* \*